Sept. 11, 1962 K. REINIGER 3,053,477
AIRCRAFT, ESPECIALLY VERTICAL TAKE-OFF AIRCRAFT
Filed Aug. 25, 1959
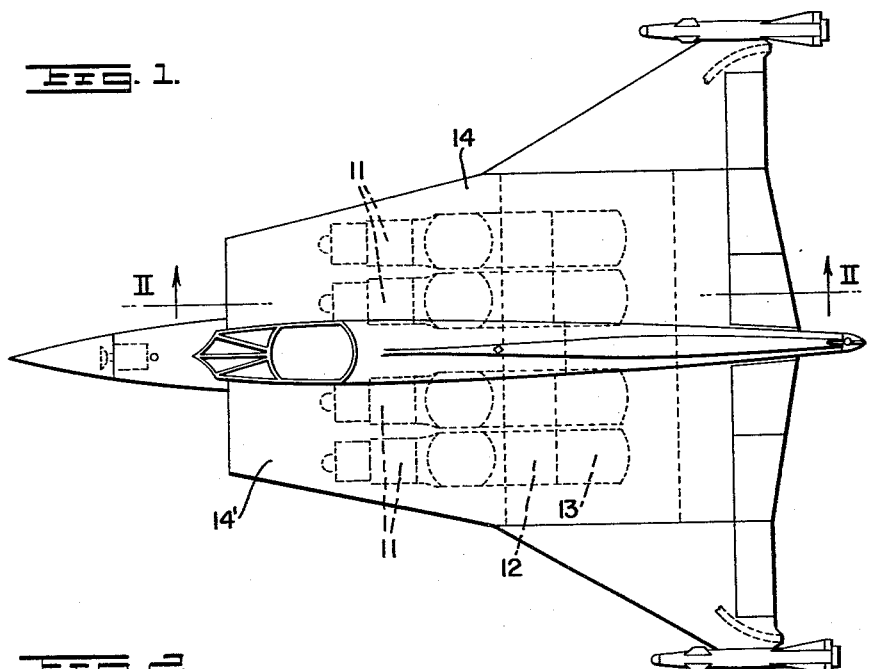
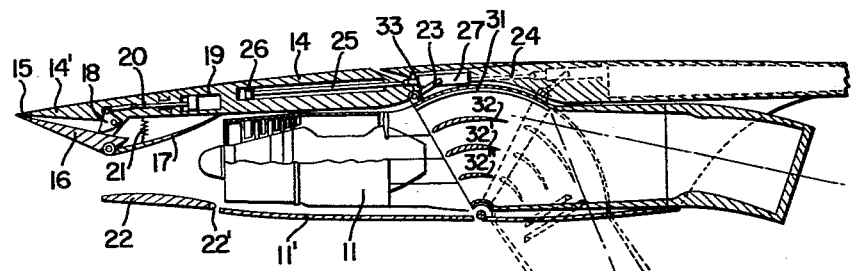
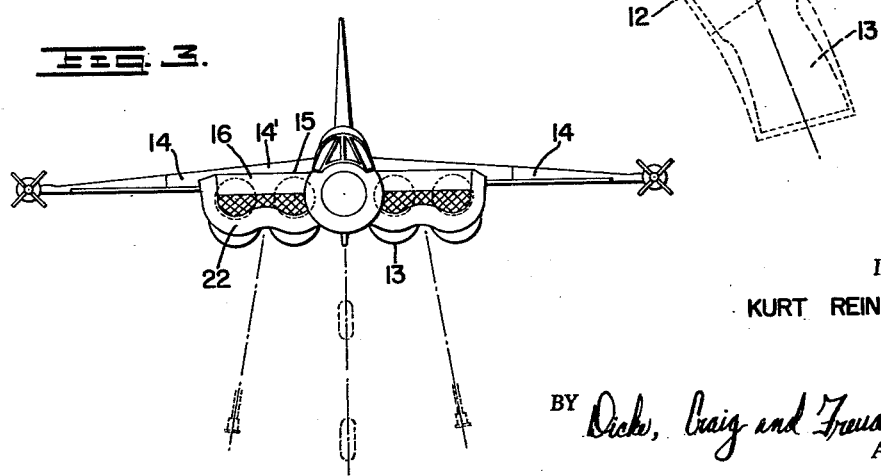
INVENTOR
KURT REINIGER
BY *Dicke, Craig and Freudenberg*
ATTORNEYS

United States Patent Office 3,053,477
Patented Sept. 11, 1962

3,053,477
AIRCRAFT, ESPECIALLY VERTICAL
TAKE-OFF AIRCRAFT
Kurt Reiniger, Stuttgart-Zuffenhausen, Germany, assignor to Daimler-Benz Aktiengesellschaft, Stuttgart-Unterturkheim, Germany
Filed Aug. 25, 1959, Ser. No. 836,018
Claims priority, application Germany Aug. 27, 1958
17 Claims. (Cl. 244—12)

The present invention relates to an aircraft, and particularly to a vertical take-off and short take-off aircraft provided with a plurality of jet power plants, especially gas turbine power plants for propelling the aircraft.

In the case of vertical take-off and short take-off aircraft in which the gas turbine power plants are built into cells or nacelles or into the wings of the aircraft, it has already been proposed in the prior art to pivotally mount the afterburner together with the thrust nozzle at the remainder of the power plant.

In connection with aircraft which have to satisfy vertical take-off and vertical landing characteristics, it is well known to pivotally mount the gas turbine power plants within the wings or to pivotally suspend the power plants along the outer sides of the aircraft wings. During take-off and during landing of such known aircraft, the power plants are pivoted through or adjusted to an angle of 90° or less than 90° with respect to the longitudinal axis of the aircraft so that the thrust produced thereby is directed in opposition to the gravity. During normal level flight, the power units are then rotated back to the original level position thereof so that the thrust is effective again essentially in the direction of the longitudinal axis of the aircraft.

The present invention proposes to provide an aircraft, especially a vertical take-off or short take-off aircraft which satisfies all demands that are required of such types of aircraft regarding the arrangement and the construction of the power units including the drive for the pivotal afterburner and thrust nozzle thereof and regarding the construction of the air intake and the adjusting mechanism for the control thereof.

Moreover, the present invention, aside from producing a simpler aircraft construction than those known heretofore, aims at more favorable conditions regarding servicing, repair or reconditioning and exchanging of the power units.

For a satisfactory solution of the problem, it is proposed in accordance to the present invention to mount the power units, provided especially with a pivotal afterburner including a thrust nozzle, underneath or below the aircraft wings and to construct the leading portion of the wing as a flat, one-sided and adjustable wedge-shaped member of a supersonic diffuser having a variable air inlet cross section.

It is additionally proposed, according to a further feature of the present invention, to construct the adjustable wedge-shaped displacer member of two parts, i.e., of a rigid upper part formed by the leading edge of the wing and of a wedge-shaped flap that is movably connected with the rigid upper part and preferably pivotally supported at the forward or leading edge of the wing.

Furthermore, it is proposed, according to the present invention, to pivotally arrange, along the rear end of the wedge-shaped flap, an air guide wall that forms the upper boundary in the subsonic range of the inlet diffuser.

It is further proposed according to the present invention to arrange an adjusting device within the wedge-shaped displacer member, preferably in the form of a spreading or expanding device.

With a construction according to the present invention, the following advantages are obtained:

(1) By arranging or mounting the power units to the underside of the wing, the wing, with respect to its static construction, becomes simpler than arrangements in which the power units are housed or accommodated within the aircraft wings.

(2) The power units, when mounted below or suspended from the wings, provide better accessibility for servicing the same and also provide for easier exchange of power units.

(3) Additionally, the cells for the power units are unaffected by changes that may be made in the construction of the power units as, for instance, in the further development and progress in the design of the power plant. In other words, the cell that normally houses the power unit of present-day design does not have to be re-designed to be adapted to any changes made in the power unit.

(4) Furthermore, the wings may be better utilized for accommodating the fuel tanks and other fuel equipment when the power units are mounted below or suspended from the wings as proposed according to the present invention.

(5) Moreover, the arrangement according to the present invention provides for more favorable air inlet conditions inasmuch as long air channels or conduits, for guiding the air to the power unit, are avoided.

Accordingly, it is an object of the present invention to provide a power unit particularly suitable for a vertical take-off or short take-off aircraft which is simple in construction, and which mounted underneath or suspended from the wing of the aircraft simplifies the construction of the wings, particularly as to static conditions and accommodation of fuel tanks.

Another object of the present invention resides in the provision of a power unit for a vertical or short take-off aircraft in which the afterburner and the thrust nozzle, combined into one structural unit are pivotally mounted on the remainder of the power plant to permit facilitated operational controls therefor.

Still another object of the present invention resides in the provision of a power unit for a vertical or short take-off aircraft which includes a variable-area, supersonic air-intake diffuser formed by the front portion of the aircraft wing as a one-sided, adjustable wedge-shaped displacer member.

A further object of the present invention is to provide a vertical and short take-off aircraft for which installing and dismantling of the power unit or units is greatly facilitated.

A still further object of the present invention is to provide a vertical and short take-off aircraft in which the accessibility to the power units and servicing thereof is greatly facilitated.

Still another object of the present invention lies in the provision of a power unit for a vertical and short take-off aircraft which does not require a special cell or housing for the accommodation thereof in the aircraft wings.

Another object of the present invention lies in the provision of a power plant for vertical and short take-off aircraft which requires extremely short air inlet guide channels leading thereto.

A still further object of the present invention lies in the provision of a power plant for a vertical or short take-off aircraft which operates at relatively high efficiency during take-off as well as level flight.

These and other objects, features and advantages of the present invention will become more obvious from the following description when taken in connection with the accompanying drawing, which shows, for purposes of illustration only, one embodiment in accordance with the present invention and wherein:

FIGURE 1 is a top plan view of the aircraft according to the present invention having a plurality of power units arranged at the underside of the wings thereof, FIGURE 2 is a cross-sectional view of the aircraft illustrated in FIGURE 1 taken along line II—II thereof, and FIGURE 3 is a front elevational view of the aircraft illustrated in FIGURE 1.

Referring now to the drawings, wherein like reference numerals are used throughout the views thereof to designate like parts, reference numeral 11 designates the individual power units which are arranged at the underside of the wings 14 of a Delta-wing aircraft having a centrally arranged fuselage. The afterburner 12 together with the thrust nozzle 13 of each power plant is pivotally attached to the remainder of the power unit 11, as will be described more fully hereinafter.

The aircraft is provided with a supersonic diffuser which is adjustable in the inlet cross section thereof and which is provided in its upper portion with an essentially flat and unilateral, adjustable wedge-shaped displacer member. The wedge-shaped displacer member essentially consists of a rigid upper part 14′ formed by the nose portion of the wings 14 and of a pivotally secured wedge-shaped flap 16 pivotally connected at the forward wing edge 15 in any suitable manner and connected with respect to the upper part 14′ so as to be movable relative thereto. An air guide wall 17 constituted by an elastically deformable wall portion pretensioned, for example, by means of spring 21 is pivotally connected with the read end of the wedge-shaped flap 16 and forms the upper boundary of the subsonic region of the air inlet.

An adjusting mechanism in the form of an expansion-type mechanism is arranged within the wedge-shaped displacer member 14′, 15, 16 and consists of a cam 18 that may, for instance, be hydraulically operated by means of a piston in piston chamber 19 and piston rod 20. The cam 18 is in operative engagement with the inside of the wedge-shaped flap 16 so as to enable adjustment of the position of the flap 16 by means of the cam 18.

Resetting of the wedge-shaped flap 16 and of the air guide wall 17 to the wide-open position of the diffuser inlet may be accomplished, for instance, by means of a tension spring 21 attached, on the one hand, to the upper portion 14′ and, on the other, to the air guide wall 17.

The guide lip 22 which forms the lower wall of the subsonic range of the air intake is also pivotally mounted at 22′ on a relatively fixed part (not shown) of the aircraft, for example, to the housing 11′ of the power plant.

The adjusting device for the pivotally supported afterburner and thrust nozzle assembly 12, 13 according to the present invention consists of a connecting link 23 pivotally attached at the forward end thereof to the afterburner housing 31 by means of a lug 33 or the like, while the rear end of link 23 is connected with a slide member 27 that is slidably guided along a guide rod 24 or the like. A connecting rod 25 is operatively connected with the slide member 27 and may, for instance, be moved by means of a hydraulically operated piston 26.

The afterburner 12 is provided at the entrance portion thereof with guide vanes 32, 32′ and 32″ arranged in such a manner that in the normal position of the afterburner and thrust nozzle assembly 12, 13, shown in full line in FIGURE 2, the gases from the gas turbine are guided toward the thrust nozzle disposed in an essentially horizontal plane during level flight. On the other hand, if the afterburner and thrust nozzle assembly 12, 13 are moved into the position shown in dot-and-dash line in FIGURE 2 in which it is effective as a vertical take-off assist, the guide vanes 32, 32′ and 32″ in effect deflect the exhaust gases in the direction of the axis of the afterburner 12.

The fuselage and wing construction of the aircraft in accordance with the present invention may be of any suitable known construction. Moreover, the drive units for the aircraft may be secured to the wings by any known means. Additionally, the guide lip 22 is pivotally mounted in any suitable manner and may be provided with an adjusting mechanism, for example, a hydraulic adjusting mechanism of any known construction to produce a controlled adjustment thereof.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. In an aircraft, particularly in a vertical take-off or short take-off aircraft provided with wing means, the combination comprising jet power plant means mounted underneath said wing means, said jet power plant means including supersonic diffuser means, thrust nozzle means and afterburner means, and said wing means being provided with a front portion constituting essentially flat and one-sided, adjustable displacer means of wedge shape in the upper portion of the inlet section of said diffuser means to thereby enable adjustment of the inlet cross section thereof.

2. In an aircraft, the combination according to claim 1, wherein said adjustable displacer means is formed of two parts, one of said parts being a rigid upper part constituted by the front portion of said wing means and the other part being a wedge-shaped flap member pivotally secured at said first-mentioned part.

3. In an aircraft, the combination according to claim 1, wherein said diffuser means includes a lower guide lip in the inlet section thereof, and means for adjusting the position of said guide lip.

4. In an aircraft, the combination according to claim 1, further comprising control means for adjustably controlling said displacer means.

5. In an aircraft, particularly in a vertical take-off or short take-off aircraft provided with wing means, the combination comprising jet power plant means mounted underneath said wing means, said jet power plant means including supersonic diffuser means, thrust nozzle means and afterburner means, means securing said thrust nozzle means and afterburner means to said power plant means to enable relative movement with respect thereto, and said wing means being provided with a front portion constituting essentially flat and one-sided adjustable displacer means of wedge shape in the upper portion of the inlet section of said diffuser means to thereby enable adjustment of the inlet cross section thereof.

6. In an aircraft, the combination according to claim 5, wherein said displacer means consists of two parts, one of said parts being a rigid upper part formed by the front portion of said wing means, and the other part being a wedge-shaped flap member pivotally secured to said one part.

7. In an aircraft, particularly in a vertical take-off or short take-off aircraft provided with wing means, the combination comprising jet power plant means mounted underneath said wing means, said jet power plant means including supersonic diffuser means, thrust nozzle means and afterburner means, means securing said thrust nozzle means and afterburner means to said power plant means to enable relative movement with respect thereto, said wing means being provided with a front portion constituting essentially flat and one-sided adjustable displacer means of wedge shape in the inlet section of said diffuser means to thereby enable adjustment of the inlet cross section thereof, said displacer means consisting of two parts, one of said parts being a rigid upper part formed by the front portion of said wing means, and the other part being a wedge-shaped flap member pivotally secured to said one part, said flap member being provided with a rearward extension consisting of an elastically deformable wall under pretension and forming the upper boundary of the subsonic region of the inlet section of said diffuser means.

8. In an aircraft, the combination according to claim 7, further comprising a lower guide member forming the lower guide wall of the inlet section of said diffuser means, said lower guide member being adjustable relative to said power plant means.

9. In an aircraft, particularly in a vertical take-off or short take-off aircraft provided with wing means, the combination comprising at least one jet power plant mounted underneath said wing means, each jet power plant including supersonic diffuser means, thrust nozzle means, and afterburner means combined with said thrust nozzle means to form a unitary structure, means pivotally securing said unitary structure on said power plant to enable relative pivotal movement with respect thereto, said wing means being provided with a front portion constituting essentially flat and one-sided, adjustable displacer means of wedge shape in the upper portion of the inlet section of said diffuser means to thereby enable adjustment of the inlet cross section thereof, said displacer means including a wedge-shaped flap member in the supersonic region of said diffuser means and an auxiliary air guide wall in the subsonic region thereof.

10. In an aircraft, particularly in a vertical take-off or short take-off aircraft provided with wing means, the combination comprising at least one jet power plant mounted underneath said wing means, each jet power plant including supersonic diffuser means, thrust nozzle means, and afterburner means combined with said thrust nozzle means to form a unitary structure, means pivotally securing said unitary structure on said power plant to enable relative pivotal movement with respect thereto, said wing means being provided with a front portion constituting essentially flat and one-sided, adjustable displacer means of wedge shape in the inlet section of said diffuser means to thereby enable adjustment of the inlet cross section thereof, said displacer means including a wedge-shaped flap member in the supersonic region of said diffuser means and an auxiliary air guide wall in the subsonic region thereof, and adjusting mechanism disposed within said wedge-shaped displacer means including a piston actuated by a pressure medium, a cam, a piston rod operatively connecting said piston with said cam, said cam being in operative engagement with said flap member to adjust the same in the sense of closing the inlet section of said diffuser means, and means for pretensioning said aid guide wall and flap member to assure pretensioned abutment of the latter against the said cam.

11. In an aircraft, the combination according to claim 10, further comprising control means for pivoting said unitary structure relative to said power plant including guide means, a guide member guided by said guide means, means operatively connecting said guide member with said unitary structure, and means actuated by a pressure medium for controllably displacing said guide member along said guide means.

12. An aircraft, particularly a vertical take-off or short take-off aircraft having wing means, comprising at least one jet propulsion power plant mounted underneath said wing means, said propulsion power plant including a main power plant section, afterburner means and thrust nozzle means, said afterburner means together with said thrust nozzle means forming an adjustable unit movable relative to said main power plant section, means operatively connecting said unit to said power plant to enable relative movement therebetween, and supersonic diffuser means disposed at the upper portion of the inlet to said power plant for guiding the flow of combustion air to said main power plant section including adjustable, essentially flat, one-sided displacer wedge means formed by the leading portion of said wing means to controllably adjust the inlet cross-sectional area of said diffuser means.

13. In an aircraft, the combination according to claim 12, further comprising adjusting means for adjustably controlling the relative movement between said unit and said power plant.

14. In an aircraft, the combination according to claim 12, further comprising a piston actuated by a pressure medium and operatively connected with said displacer wedge means for adjustably controlling the inlet cross-sectional area of said diffuser means.

15. In an aircraft, particularly in a vertical take-off or short take-off aircraft provided with wing means, the combination comprising jet power plant means mounted underneath said wing means, said jet power plant means including supersonic diffuser means, thrust nozzle means and afterburner means, and said wing means being provided with a front portion constituting essentially flat and one-sided, adjustable displacer means of wedge shape in the inlet section of said diffuser means to thereby enable adjustment of the inlet cross section thereof, said displacer means including a wedge-shaped flap member provided with a rearward extension constituted by an elastically deformable wall portion forming the upper boundary of a subsonic region of the inlet of said supersonic diffuser, and means for pretensioning said wall portion.

16. In an aircraft, particularly in a vertical take-off or short take-off aircraft provided with wing means, the combination comprising jet power plant means mounted underneath said wing means, said jet power plant means including supersonic diffuser means, thrust nozzle means and afterburner means, and said wing means being provided with a front portion constituting essentially flat and one-sided, adjustable displacer means of wedge shape in the upper portion of the inlet section of said diffuser means to thereby enable adjustment of the inlet cross section thereof, said displacer means including a forwardly disposed wedge-shaped flap member, and a further adjustable member pivotally secured along the rear end of said flap member and forming an air guide wall portion.

17. In an aircraft, particularly in a vertical take-off or short take-off aircraft provided with wing means, a jet power plant means comprising supersonic diffuser means, and thrust nozzle means, said supersonic diffuser means including an adjustable displacer means, said adjustable displacer means including a substantially wedge-shaped flap member provided with a rearward extension constituted by an elastically deformable wall portion forming an air guide wall.

References Cited in the file of this patent

UNITED STATES PATENTS

| 2,409,176 | Allen | Oct. 15, 1946 |
| 2,516,671 | Bower et al. | July 25, 1950 |
| 2,912,188 | Singelmann et al. | Nov. 10, 1959 |
| 2,944,765 | Lane | July 12, 1960 |
| 2,950,594 | Mitrovich | Aug. 30, 1960 |
| 2,986,877 | Emmons | June 6, 1961 |

OTHER REFERENCES

SAE Journal, vol. 66, No. 8, page 32, Aug. 1958.